(12) United States Patent
Eom et al.

(10) Patent No.: US 10,020,547 B2
(45) Date of Patent: Jul. 10, 2018

(54) BATTERY PACK

(71) Applicant: LG CHEM, LTD., Seoul (KR)

(72) Inventors: Young-Sop Eom, Daejeon (KR);
Jun-Yeob Seong, Daejeon (KR);
Ki-Youn Kim, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 348 days.

(21) Appl. No.: 14/439,982

(22) PCT Filed: Oct. 17, 2014

(86) PCT No.: PCT/KR2014/009803
§ 371 (c)(1),
(2) Date: Apr. 30, 2015

(87) PCT Pub. No.: WO2015/057022
PCT Pub. Date: Apr. 23, 2015

(65) Prior Publication Data
US 2015/0295283 A1    Oct. 15, 2015

(30) Foreign Application Priority Data

Oct. 17, 2013 (KR) .................. 10-2013-0123822
Sep. 19, 2014 (KR) .................. 10-2014-0125231
Oct. 17, 2014 (KR) .................. 10-2014-0140825

(51) Int. Cl.
*H01M 10/42* (2006.01)
*H01M 10/48* (2006.01)
*H01M 2/10* (2006.01)

(52) U.S. Cl.
CPC ....... *H01M 10/482* (2013.01); *H01M 2/1077* (2013.01); *H01M 10/425* (2013.01);
(Continued)

(58) Field of Classification Search
CPC .. H01M 10/482; H01M 10/48; H01M 10/425; H01M 2/1077; H01M 2010/4271; H01M 2220/20; H01M 2210/103
See application file for complete search history.

(56) References Cited

U.S. PATENT DOCUMENTS

2010/0124693 A1* 5/2010 Kosugi .............. G01R 31/3644
429/92
2011/0111649 A1* 5/2011 Garascia ............. H01M 2/1077
439/890

(Continued)

FOREIGN PATENT DOCUMENTS

EP    2 337 111 A2    6/2011
JP    11-003735    *    6/1999    ............... H01R 4/38

(Continued)

OTHER PUBLICATIONS

JP2000-062473, Machine Translation, Yasugadaira, Feb. 2000.*
(Continued)

*Primary Examiner* — Devina Pillay
(74) *Attorney, Agent, or Firm* — Birch, Stewart, Kolasch & Birch, LLP

(57) ABSTRACT

Disclosed is a battery pack, which allows easy assembling and exchange of electrical equipment and has an uncomplicated structure. The battery pack includes at least one battery module, the battery module including a plurality of secondary batteries, and an electrical equipment plate having a plate shape on which at least two of a battery management system (BMS), a current sensor, a relay and a fuse are mounted, the electrical equipment plate being electrically connected to the at least one battery module.

16 Claims, 6 Drawing Sheets

(52) U.S. Cl.
CPC .... *H01M 10/48* (2013.01); *H01M 2010/4271* (2013.01); *H01M 2200/103* (2013.01); *H01M 2220/20* (2013.01)

(56) References Cited

U.S. PATENT DOCUMENTS

| | | | |
|---|---|---|---|
| 2012/0301747 A1* | 11/2012 | Han | H01M 2/1005 429/7 |
| 2013/0020987 A1* | 1/2013 | Ikeda | H01M 10/425 320/107 |
| 2013/0288530 A1* | 10/2013 | Zhao | H01M 2/206 439/627 |
| 2014/0065859 A1* | 3/2014 | Lee | H01R 13/64 439/135 |
| 2014/0141287 A1* | 5/2014 | Bertucci | H01M 10/425 429/7 |
| 2014/0295216 A1* | 10/2014 | Matsuda | H01M 2/1083 429/7 |

FOREIGN PATENT DOCUMENTS

| | | | | |
|---|---|---|---|---|
| JP | 2000-062473 | * | 2/2000 | ............. H01M 2/10 |
| JP | 2008-270121 A | | 11/2008 | |
| JP | 2010-123299 A | | 6/2010 | |
| JP | 2012-59663 A | | 3/2012 | |
| JP | 2012-182082 A | | 9/2012 | |
| JP | 2013-196932 A | | 9/2013 | |
| KR | 10-2012-0100712 A | | 9/2012 | |
| WO | WO 2008/035873 A1 | | 3/2008 | |
| WO | WO 2010/144396 A2 | | 12/2010 | |

OTHER PUBLICATIONS

JP11-003735, Machine Translation, Shiohama (Year: 1999).*
International Search Report, issued in PCT/KR2014/009803, dated Jan. 26, 2015.

* cited by examiner

BATTERY PACK

TECHNICAL FIELD

The present disclosure relates to a battery pack including a plurality of secondary batteries, and more particularly, to a battery pack including electrical equipment, which allows optimal arrangement and easy exchange of the electrical equipment and ensures simple assembling and uncomplicated structure.

The present application claims priority to Korean Patent Application No. 10-2013-0123822 filed on Oct. 17, 2013, Korean Patent Application No. 10-2014-0125231 filed on Sep. 19, 2014 and Korean Patent Application No. 10-2014-0140825 filed on Oct. 17, 2014 in the Republic of Korea, the disclosures of which are incorporated herein by reference.

BACKGROUND ART

Recently, with the active development of electric vehicles, storage batteries, robots, satellites, and the like, along with the dramatically increasing demand for portable electronic products such as laptop computers, video cameras, mobile phones, and the like, research and development for high-performance secondary batteries capable of repeatedly charging and discharging has been actively made.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a cathode active material and anode active material, respectively. The lithium secondary battery includes an electrode assembly in which a cathode plate and an anode plate respectively coated with the cathode active material and the anode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

In these days, secondary batteries are widely used not only for small-sized devices such as portable electronic devices but also for middle-sized or large-sized devices such as vehicles and power storages. In particular, along with exhaustion of carbon energy and increased interest on environments, the public attention is focused on hybrid vehicles and electric vehicles over the world, including USA, Europe, Japan and Korea. In such hybrid vehicles and electric vehicles, the most essential part is a battery pack which gives a driving force to a vehicle motor. A hybrid vehicle or an electric vehicle ensures better fuel efficiency and exhausts no or less pollutant substances since a driving force for a vehicle is obtained by charging/discharging a battery pack. For this reason, more and more vehicle users select such hybrid vehicles and electric vehicles. In addition, the battery pack of the hybrid or electric vehicle includes a plurality of secondary batteries, which are connected in series or in parallel to enhance capacity and output.

Meanwhile, the battery pack may include various electric parts together with a plurality of secondary batteries, and these electric parts are called electrical equipment. The electrical equipment included in the battery pack representatively may be a relay, a current sensor, a fuse, a battery management system (BMS) or the like. Such electrical equipment serves as a component for managing charging/discharging of a secondary battery included in the battery pack and ensuring safety, and is essentially included in most kinds of battery packs.

In case of an existing battery pack, such electrical equipment is mounted to an inside or outside of the battery pack, but this electrical equipment arrangement causes several problems. For example, in an existing battery pack, in order to ensure a space for mounting a plurality of electrical equipment, it is required to increase a volume of the battery pack or decrease an accommodation space of the secondary battery. In addition, in an existing battery pack, it is not easy to dispose and assemble each of electrical equipment to an inside or outside of the battery pack, and it is also not easy to connect the electrical equipment to a battery module included in the secondary battery. Moreover, in an existing battery pack, if any part of the electrical equipment needs to be exchanged due to a breakdown, it is not easy to exchange the part since the electrical equipment is installed with a complicated structure.

DISCLOSURE

Technical Problem

The present disclosure is designed to solve the problems of the related art, and therefore the present disclosure is directed to providing a battery pack, which allows easy installation or exchange of electrical equipment and has a simple structure, and a vehicle including the battery pack.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery pack, which includes at least one battery module, the battery module including a plurality of secondary batteries; and an electrical equipment plate having a plate shape on which at least two of a battery management system (BMS), a current sensor, a relay and a fuse are mounted, the electrical equipment plate being electrically connected to the at least one battery module.

Preferably, the electrical equipment plate may be located at an upper portion of the battery module.

Also preferably, at least one bus bar may be mounted on the electrical equipment plate, and at least two of the current sensor, the relay and the fuse may be electrically connected by the bus bar.

Also preferably, a plate protrusion may be provided on the electrical equipment plate, a coupling hole may be formed in the at least one bus bar, and the plate protrusion may be inserted into the coupling hole so that the bus bar is fixed onto the electrical equipment plate.

Also preferably, through holes may be formed in both terminals of at least one of the current sensor, the relay and the fuse, and the plate protrusion may be inserted into the through holes so that both terminals of at least one of the current sensor, the relay and the fuse are connected and fixed to the bus bar.

Also preferably, the plate protrusion may be fixed by a nut after being inserted into the coupling hole and the through holes.

Also preferably, the plate protrusion may be firstly inserted into the coupling hole of the bus bar and then inserted into the through hole of at least one of the current sensor, the relay and the fuse.

Also preferably, the battery module may include a cathode module terminal and an anode module terminal which protrude upwards, coupling holes are formed in at least two of the bus bars, and the cathode module terminal and the anode module terminal may be respectively inserted into the coupling holes of the two bus bars for electric connection and fixation.

Also preferably, the electrical equipment plate may have a bus bar insert so that the bus bar is at least partially inserted into the bus bar insert.

Also preferably, the battery module may include a module protrusion formed at an upper portion thereof, and the electrical equipment plate may have a plate hole formed at a location corresponding to the module protrusion, so that the module protrusion is inserted into and fixed in the plate hole.

Also preferably, the BMS may have a connection hole formed at a location corresponding to the plate hole, so that the module protrusion is inserted into and fixed in both the plate hole and the connection hole.

Also preferably, the battery module may include a connector connected to both ends of at least one of the plurality of secondary batteries, and the connector is inserted into a port of the BMS.

In addition, the battery pack according to the present disclosure may further include a pack case for accommodating the battery module and the electrical equipment plate in an inner space thereof.

Also preferably, the pack case may include a lower case having an inner space with an open upper portion and an upper case coupled to the upper open portion of the lower case.

Also preferably, the pack case may have an opening formed in an upper portion thereof at a location corresponding to at least one of the BMS, the current sensor, the relay and the fuse.

Also preferably, the pack case may have a cover provided at the opening to open or close the opening.

In addition, the at least one battery module may be a plurality of battery modules which are arranged in parallel in a horizontal direction, and the electrical equipment plate may be located on the plurality of battery modules arranged in parallel in a horizontal direction.

In addition, the at least one battery module may be a plurality of battery modules which are stacked in parallel in a vertical direction, and the electrical equipment plate may be located on an uppermost battery module among the plurality of battery modules.

In addition, the battery pack according to the present disclosure may further include a module case for accommodating the battery module in an inner space thereof, in which the electrical equipment plate is located on the module case.

In another aspect, of the present disclosure, there is also provided a vehicle, which includes the above battery pack.

Advantageous Effects

According to the present disclosure, there is provided a battery pack which ensures easy installation and assembling of electrical equipment. Therefore, since the battery pack may be produced more rapidly, the productivity may be improved, and its manufacturing process or apparatus may be simplified.

In addition, in an aspect of the present disclosure, when any part of the electrical equipment breaks, it is possible to easily exchange only the broken part.

Moreover, in an aspect of the present disclosure, various kinds of electrical equipment may be electrically connected when the electrical equipment is assembled to an electrical equipment plate.

In addition, in an aspect of the present disclosure, since various kinds of electrical equipment may be assembled onto a single electrical equipment plate, the various kinds of electrical equipment may be managed as a single plate unit, which allows easier management of the electrical equipment.

Further, in an aspect of the present disclosure, since a component such as an internal circuit board (ICB) may not be separately provided to the battery pack, the battery pack may have a simpler structure and may also be assembled more easily.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
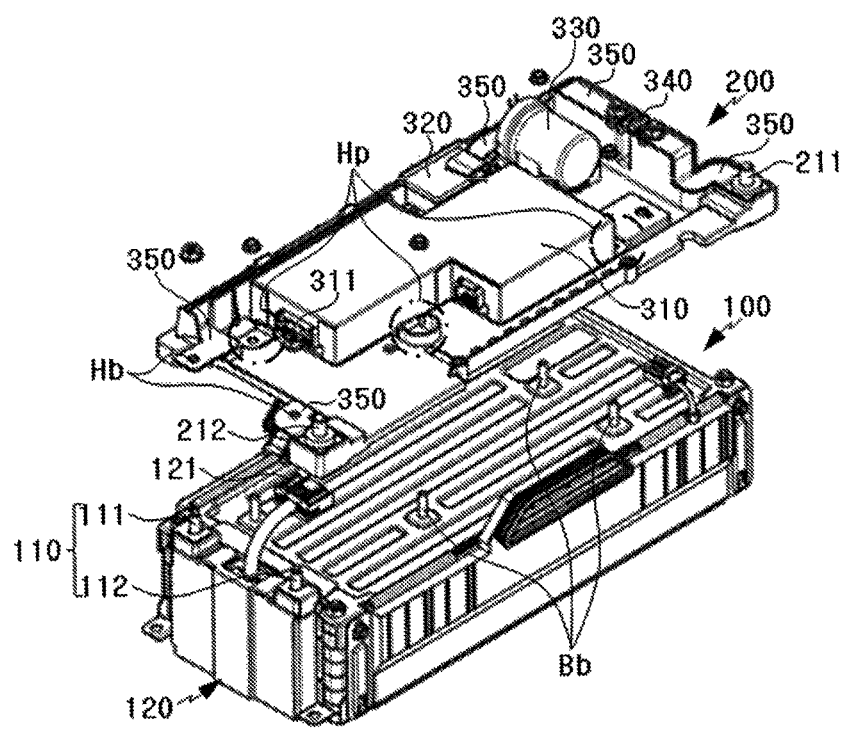
FIG. 1 is an exploded perspective view schematically showing a battery pack according to an embodiment of the present disclosure.

FIG. 1 is an exploded perspective view schematically showing a battery pack according to an embodiment of the present disclosure.

Referring to FIG. 1, the battery pack according to the present disclosure includes a battery module 100 and an electrical equipment plate 200.

The battery module 100 includes a plurality of secondary batteries. In addition, the battery module 100 may further include metallic end plates located above and below the secondary batteries, a duct for allowing air to flow into or out of the battery module 100, and a sensing module 120 connected to an electrode tab of the secondary battery to sense a voltage of the secondary battery or the like, in addition to the secondary batteries.

Meanwhile, the secondary batteries included in the battery module 100 may be pouch-type secondary batteries, and the pouch-type secondary batteries may be stacked in a horizontal or vertical direction. At this time, in order to facilitate easier stacking of the pouch-type secondary batteries, the battery module 100 may further include a stacking frame. The stacking frame holds a secondary battery to prevent shaking of the secondary battery, and a plurality of stacking frames may be stacked to guide a plurality of secondary batteries to be stacked. The stacking frame may also be named various terms such as a cartridge and may have a rectangular ring shape with a hollow center. In this case, four edges of the stacking frame may be located at an outer circumference of the secondary battery.

The electrical equipment plate 200 may have a plate shape having wide surfaces at its upper and lower portions. In addition, electrical equipment is mounted to the wide upper surface of the electrical equipment plate 200. Here, the electrical equipment mounted to the upper portion of the electrical equipment plate 200 may include at least one of a battery management system (BMS) 310, a current sensor 320, a relay 330 and a fuse 340.

The electrical equipment plate 200 will be described later in more detail with reference to FIGS. 2 and 3.

Figure 2:
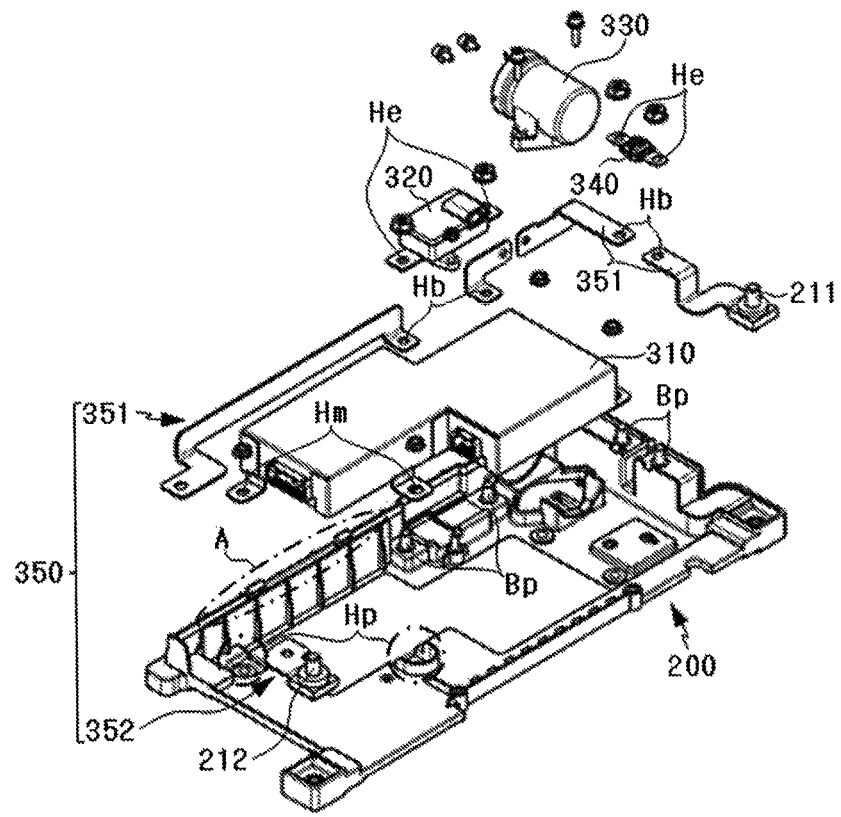
FIG. 2 is an exploded perspective view schematically showing an electrical equipment plate according to an embodiment of the present disclosure.
Figure 3:
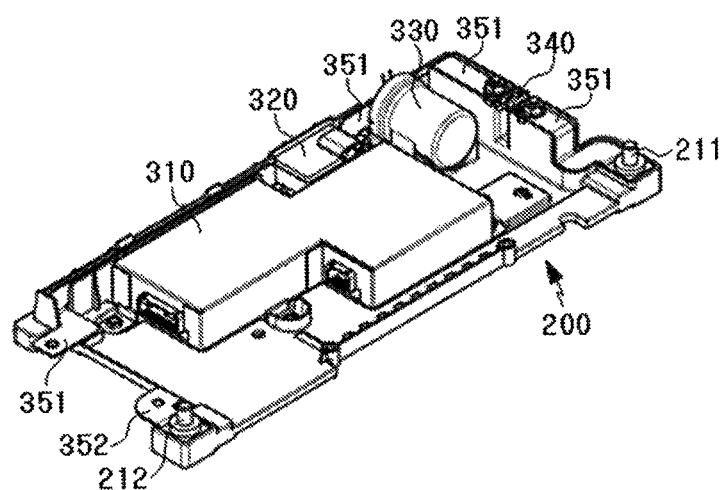
FIG. 3 is a perspective view showing an assembled state of the electrical equipment plate of FIG. 2.

FIG. 2 is an exploded perspective view schematically showing the electrical equipment plate 200 according to an embodiment of the present disclosure, and FIG. 3 is a perspective view showing an assembled state of the electrical equipment plate 200 of FIG. 2.

Referring to FIGS. 2 and 3, the BMS 310, the current sensor 320, the relay 330 and the fuse 340 may be mounted on the electrical equipment plate 200 according to the present disclosure.

Here, the BMS 310 represents a battery management unit for controlling charging/discharging operations of a battery pack as a whole, and the BMS 310 is generally included in a battery pack.

In addition, the current sensor 320 senses a charging/discharging current of the battery pack, and the relay 330 is a switching unit for selectively opening or closing a charging/discharging path on which a charging/discharging current of the battery pack flows. In addition, the fuse 340 is provided on the charging/discharging path of the battery pack and serves as a component for blocking the charging/discharging current by fusing off when an abnormal situation occurs at the battery pack. The current sensor 320, the relay 330 and the fuse 340 may exchange information with the BMS 310 and be controlled by the BMS 310.

The BMS 310, the current sensor 320, the relay 330 and the fuse 340 are obvious to those skilled in the art and thus are not described in detail here.

In addition to the above electrical equipment, at least one bus bar 350 may be mounted onto the electrical equipment plate 200. The bus bar 350 connects a module terminal 110 to a pack terminal to configure a charging/discharging path, and may also electrically connect the current sensor 320, the relay 330 and the fuse 340. Here, the module terminal 110 is a terminal provided at the battery module 100 and may include a cathode module terminal 111 and an anode module terminal 112. In addition, the pack terminal is a terminal provided at the battery pack, which is used when connecting an external charging/discharging device to the battery pack, and may include a cathode pack terminal 211 and an anode pack terminal 212.

In particular, the bus bar 350 may include a cathode bus bar 351 and an anode bus bar 352. Here, the cathode bus bar 351 electrically connects the cathode module terminal 111 and the cathode pack terminal 211, and the anode bus bar 352 electrically connects the anode module terminal 112 and the anode pack terminal 212. As described above, since the bus bar 350 is used for electrical connection, the bus bar 350 may be made of electrically conductive material, particularly metallic material such as copper in order to ensure mechanical strength to some extent.

Meanwhile, there may be provided two or more cathode bus bars 351 or anode bus bars 352. For example, as shown in FIG. 2, four cathode bus bars 351 may be provided and a single anode bus bar 352 may be provided. Four cathode bus bars 351 are respectively provided between the cathode module terminal 111 and the current sensor 320, between the current sensor 320 and the relay 330, between the relay 330 and the fuse 340, and between the fuse 340 and the cathode pack terminal 211 to electrically connect them. In this configuration, the cathode module terminal 111 may be electrically connected to the cathode pack terminal 211 after passing through the bus bar 350, the current sensor 320, the bus bar 350, the relay 330, the bus bar 350, the fuse 340 and the bus bar 350 in order.

Here, the bus bar 350 and each of electrical equipment may be connected and fixed to each other by using bolts. For this, holes (through hole), designated by He in FIG. 2, may be formed at both ends of the electrical equipment, and a hole (a coupling hole), designated by Hb in FIG. 2, may also be formed in at least one side of the bus bar 350 at a location corresponding to the through hole of the electrical equipment. In this case, the electrical equipment and the bus bar 350 may be coupled and fixed to each other by placing a bolt through both the through hole of the electrical equipment and the coupling hole of the bus bar 350.

Preferably, the electrical equipment plate 200 may have a plate protrusion at the upper surface thereof, as indicated by Bp in FIG. 2. In addition, a hole (a coupling hole) may be formed in at least one bus bar 350 in a shape corresponding to the plate protrusion.

For example, in the configuration of FIG. 2, assuming that cathode bus bars 351 located on a cathode current path from the cathode module terminal 111 to the cathode pack terminal 211 are a first cathode bus bar, a second cathode bus bar, a third cathode bus bar and a fourth cathode bus bar in order, coupling holes Hb may be formed in a right end of the first cathode bus bar, a left end of the second cathode bus bar, a right end of the third cathode bus bar and a left end of the fourth cathode bus bar. Here, the right side and the left side of the bus bar 350 are respectively based on the drawings depicted in FIG. 2, and an end of each bus bar 350 close to the cathode module terminal 111 is called a left end and an end close to the cathode pack terminal 211 is called a right end.

In this case, as shown in FIG. 2, the electrical equipment plate 200 may include four plate protrusions Bp. In addition, the plate protrusion may be inserted into and coupled through the coupling hole Hb of the bus bar 350. For example, four plate protrusions may be inserted into the coupling hole formed in the right end of the first cathode bus bar, the left end of the second cathode bus bar, the right end of the third cathode bus bar and the left end of the fourth cathode bus bar. Therefore, the bus bar 350 may be fixed to the upper portion of the electrical equipment plate 200 by inserting the plate protrusion of the electrical equipment plate 200 into the coupling hole.

In the above configuration of the present disclosure, since the bus bar 350 may be fixed onto the electrical equipment plate 200 by inserting the plate protrusion formed at the electrical equipment plate 200 into the coupling hole, the bus bar 350 may be assembled and connected to the electrical equipment plate 200 very simply.

Meanwhile, the electrical equipment, namely the current sensor 320, the relay 330 and the fuse 340, may include at least two terminals for the installation on the charging/discharging path. At this time, holes (through holes) may be formed in both terminals of the current sensor 320, the relay 330 and the fuse 340. In addition, the plate protrusion of the electrical equipment plate 200 may be inserted into the through hole of the electrical equipment.

For example, in the configuration of FIG. 2, through holes He may be formed in both ends of the current sensor 320 and both terminals of the fuse 340, and the plate protrusion Bp of the electrical equipment plate 200 may be inserted into such a through hole. In this case, a single plate protrusion Bp may pass through both the coupling hole Hb formed in the bus bar 350 and the through hole He formed in the electrical equipment. In this configuration of the present disclosure, since a single plate protrusion is inserted into the coupling hole of the bus bar 350 and the through hole of the electrical equipment together, it is possible to fix the bus bar 350 and the electrical equipment to the electrical equipment plate 200 and also electrically connect and fix the bus bar 350 and the electrical equipment to each other. Therefore, in this configuration of the present disclosure, the process for mounting electrical equipment to the electrical equipment plate 200 and electrically connecting them may be performed more rapidly and more easily.

In particular, in the above configuration, it is desirable to insert the plate protrusion into the coupling hole of the bus bar 350 first and then insert the plate protrusion into the through hole of the electrical equipment later. In this configuration, in a portion where the plate protrusion is provided, the electrical equipment plate 200, the bus bar 350 and the electrical equipment are stacked upwards in order. Therefore, in this configuration, since the electrical equipment is provided at the uppermost location, the electrical equipment may be easily separated. In other words, the electrical equipment such as the current sensor 320, the fuse 340 and the relay 330 sometimes needs to be exchanged due to a trouble. At this time, in the above embodiment, the electrical equipment may be separated upwards from the electrical equipment plate 200 while leaving the bus bar 350 as it is, which may facilitate the exchange work of the electrical equipment.

Also preferably, in this embodiment, after the plate protrusion is inserted into the coupling hole of the bus bar 350 and the through hole of the electrical equipment, an outer side of the plate protrusion may be fixed using a nut. In this case, in a portion where the plate protrusion is provided, the electrical equipment plate 200, the bus bar 350, the electrical equipment and the nut may be stacked upwards in order. Meanwhile, in order to couple the nut more easily, a thread may be formed on an outer surface of the plate protrusion, and the nut may be screwed to the thread of the plate protrusion. In this configuration of the present disclosure, since the nut is coupled to the outer side of the plate protrusion, the fixing state of the bus bar 350 and the electrical equipment to the plate protrusion may be maintained more stably.

Meanwhile, as shown in FIG. 1, the battery module 100 may be configured so that the cathode module terminal 111 and the anode module terminal 112 protrude upwards. In this case, at least two of the bus bars 350 may have holes (coupling holes), as indicated by Hb in FIG. 1, for the coupling with the module terminal 110 so that the cathode module terminal 111 and the anode module terminal 112 are respectively inserted into the coupling holes to electrically connect and fix each module terminal 110 to the bus bar 350. For example, referring to FIGS. 1 and 2, coupling holes Hb (see FIG. 1) may be formed in one end of the first cathode bus bar 351 and one end of the anode bus bar 352. In addition, by inserting the cathode module terminal 111 and the anode module terminal 112 respectively into the coupling holes formed in the cathode bus bar 351 and the anode bus bar 352, it is possible to electrically connect and fix the cathode bus bar 351 and the cathode module terminal 111 also electrically connect and fix the anode bus bar 352 and the anode module terminal 112. In this configuration of the present disclosure, by inserting the module terminal 110 into the coupling hole formed in the bus bar 350, it is possible to electrically connect the bus bar 350 and the module terminal 110, maintain their fixed state, simplify their fabricating process and ensure their structural stability.

Also preferably, the electrical equipment plate 200 may have a bus bar insert. In addition, in the bus bar insert, the bus bar 350 may be inserted at least partially. In this case, at least a part of the bus bar 350 may stand vertically. For example, referring to FIG. 2, the first cathode bus bar 351 may be configured to stand vertically at its central portion, except for both ends thereof. In addition, the bus bar insert having a narrow gap may be formed in the electrical equipment plate 200, as indicated by A, so that the central portion of the first cathode bus bar 351 may be inserted therein. In this case, by fitting the central portion of the first cathode bus bar 351 into the bus bar insert of the electrical equipment plate 200, the first cathode bus bar 351 may be coupled and fixed to the electrical equipment plate 200 more strongly and more stably. In addition, in this configuration, as the bus bar 350 is inserted into the bus bar insert, an exposed region of the bus bar 350 decreases, which may improve isolation of the bus bar 350. For example, in the configuration of FIGS. 2 and 3, as the first cathode bus bar 351 is inserted into the bus bar insert, an exposed area of the first cathode bus bar 351 is reduced, and the insolation against another component such as the first cathode bus bar 351 and the BMS 310 may be improved.

Meanwhile, as shown in FIG. 1, the electrical equipment plate 200 may be located on the battery module 100. In this embodiment, the battery module 100 and the electrical equipment plate 200 may be easily assembled, and the electrical equipment mounted on the electrical equipment plate 200 may be connected to the battery module 100 more easily. Moreover, the electrical equipment mounted to the electrical equipment plate 200 may be easily separated upwards, and electrical equipment may also be easily mounted from the above, which allows easy exchange of each of the electrical equipment.

Preferably, the battery module 100 may include a module protrusion at an upper portion thereof, as indicated by Bb in FIG. 1. In addition, the electrical equipment plate 200 may have a hole (a plate hole), as indicated by Hp in FIG. 1, at a location corresponding to the module protrusion of the battery module 100. In this configuration, by inserting the module protrusion Bb into the plate hole Hp, the electrical equipment plate 200 and the battery module 100 may be coupled and fixed to each other. In addition, after the module protrusion passes through the plate hole, a nut may be coupled to an outer side of the module protrusion to reinforce its fixing force. In this case, in order to facilitate easier coupling of the nut and the module protrusion, a thread may be formed at an outer surface of the module protrusion. In this configuration of the present disclosure, when the electrical equipment plate 200 is mounted onto the battery module 100, the module protrusion provided at the battery module 100 is inserted into the plate hole formed in the electrical equipment plate 200, which allows simple mounting of the electrical equipment plate 200 to the battery module 100 and also ensures stable fixation.

In this configuration, the BMS 310 may have a hole (a connection hole), as indicated by Hm in FIG. 2, at a location corresponding to the plate hole. In this case, the module protrusion Bb of the battery module 100 may pass through both the plate hole Hp and the connection hole (Hm) of the BMS 310. In this configuration, since the electrical equipment plate 200 and the BMS 310 may be coupled and fixed together by using the same module protrusion, it is possible to mount the electrical equipment plate 200 onto the battery module 100 and mount the BMS 310 onto the electrical equipment plate 200 at once, which may simplify the mounting process. Moreover, since the electrical equipment plate 200 and the BMS 310 are mounted at once, it is possible to reduce parts, costs and time required for mounting them. Further, since the space required for coupling such parts decreases, it is possible to design the battery pack in a smaller size.

Also preferably, the battery module 100 may include a connector connected to both ends of at least one secondary battery among the plurality of secondary batteries, and the connector may be inserted into a port of the BMS 310. For example, in the configuration of FIG. 1, a plurality of pouch-type secondary batteries may be stacked in the battery module 100, and electrode tabs of the stacked pouch-type secondary batteries may be formed to protrude in one direction, for example in a left direction. At this time, a sensing module 120 may be provided at a side where the electrode tabs protrude, and the sensing module 120 may come into contact with each electrode tab of the secondary battery to sense a voltage or the like of each secondary battery. In addition, the sensing module 120 may include a connector 121, and a port 311 may be formed in the BMS 310 so that the connector 121 of the sensing module 120 may be inserted therein. In this case, information about voltage or the like of each secondary battery sensed by the sensing module 120 may be transmitted to the BMS 310 via the connector 121 and the port 311, and the BMS 310 may control the charging/discharging operations of the battery pack based on the transmitted information.

Meanwhile, though not shown in FIG. 1, the battery pack according to the present disclosure may further include a pack case.

The pack case has an empty space thereon and accommodates the battery module 100 and the electrical equipment plate 200 in the inner space. The pack case is an exterior material of the battery pack, which isolates the battery module 100 and the electrical equipment plate 200 from the outside and protects the battery module 100 and the electrical equipment plate 200 against an external impact.

Figure 4:
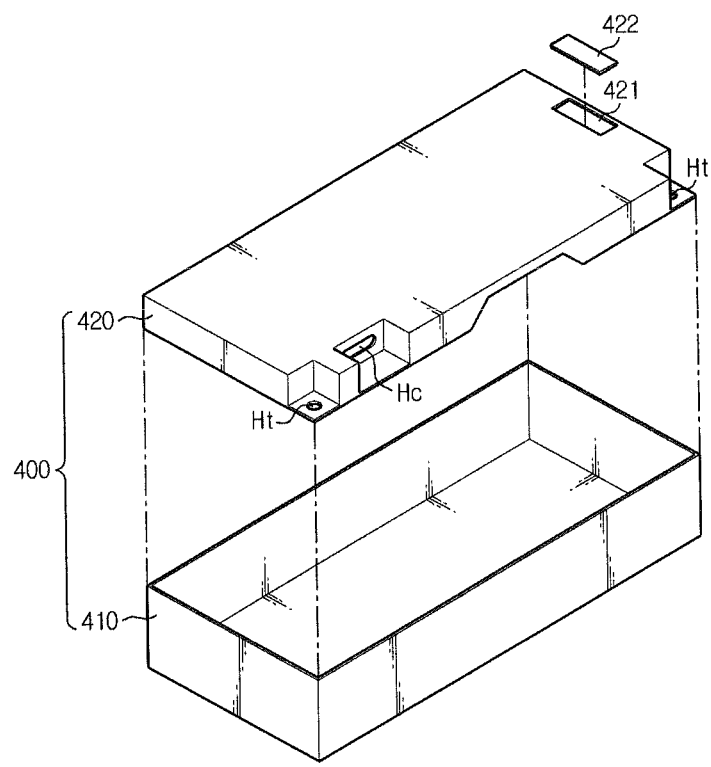
FIG. 4 is a perspective view schematically showing a pack case of a battery pack according to an embodiment of the present disclosure.

FIG. 4 is a perspective view schematically showing a pack case 400 of a battery pack according to an embodiment of the present disclosure.

Referring to FIG. 4, the pack case 400 may include a lower case 410 and an upper case 420. The lower case 410 has an inner space to accommodate most of the battery module 100 and the electrical equipment plate 200 in the inner space. In addition, the lower case 410 has an open upper portion so that the battery module 100 and the electrical equipment plate 200 are accommodated downwards. The upper case 420 is located above the lower case 410 and coupled to the open portion of the lower case 410. Therefore, if the upper case 420 is coupled to the lower case 410, the open portion of the lower case 410 is covered by the upper case 420, thereby sealing the inner space of the lower case 410 to some extent.

Preferably, the pack case 400 may have an opening 421 formed above a location corresponding to at least one electrical equipment, namely at least one of the BMS 310, the current sensor 320, the relay 330 and the fuse 340. For example, as shown in FIG. 4, at least one opening 421 may be formed in the upper case 420. In this embodiment of the present disclosure, the electrical equipment may be attached or detached more easily through the opening 421 formed in the upper case 420. For example, in the configuration of FIG. 4, the opening 421 may be formed above the fuse 340. In this case, without separating the upper case 420 from the lower case 410, the fuse 340 may be easily attached or detached through the opening 421. In this configuration of the present disclosure, if any electrical equipment needs to be exchanged due to a trouble, the corresponding electrical equipment may be exchanged through the opening 421, thereby facilitating easier exchange work.

Further preferably, if the opening 421 is formed in the pack case 400, the pack case 400 may include a cover 422 configured to open or close the opening 421. In this case, in a normal situation, the cover 422 closes the opening 421 to prevent impurities from flowing in through the opening 421. However, in a special situation, for example when it is required for exchanging any electrical equipment, the cover 422 opens the opening 421 to exchange the electrical equipment through the opening 421.

Meanwhile, even though FIG. 4 depicts that only one opening 421 is formed in the pack case 400, two or more openings 421 may also be formed in the pack case 400.

In addition, the pack case 400 may have at least one terminal hole Ht formed to expose the cathode pack terminal 211 and the anode pack terminal 212, respectively. In addition, the pack case 400 may have at least one access hole He for allowing the electrical equipment such as the BMS 310 to access an external component.

Figure 5:
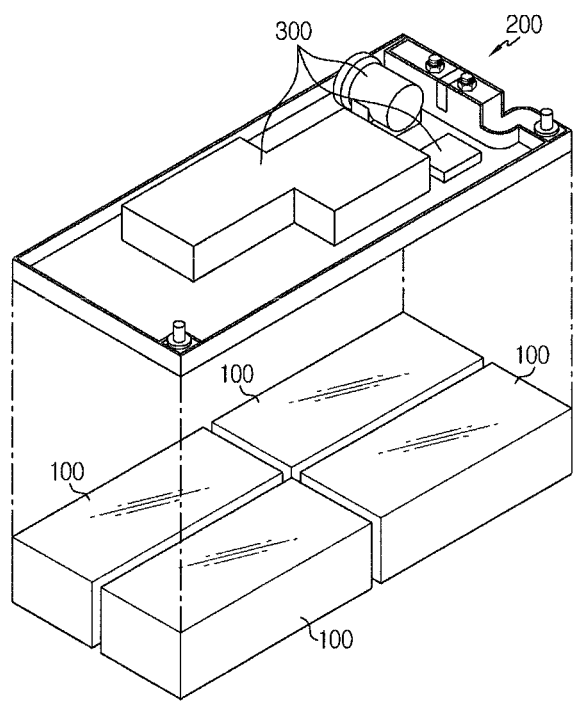
FIG. 5 is a schematic diagram showing a battery pack according to another embodiment of the present disclosure.

FIG. 5 is a schematic diagram showing a battery pack according to another embodiment of the present disclosure.

Referring to FIG. 5, the battery pack according to the present disclosure may include two or more battery modules 100. In addition, the plurality of battery modules 100 may be entirely or partially arranged in a horizontal direction.

At this time, the electrical equipment plate 200 may include at least one electrical equipment 300 and be located upon the plurality of battery modules 100. For example, as shown in FIG. 5, in case the battery pack includes four battery modules 100 which are arranged in parallel in a horizontal direction, the electrical equipment plate 200 may be configured to be located on the four battery modules 100 arranged in parallel in a horizontal direction.

In this case, the size (a vertical length) of the electrical equipment plate 200 may correspond to the size of four battery modules 100. In other words, in the embodiment of FIG. 1, since a single electrical equipment plate 200 is located on a single battery module 100, the size of the electrical equipment plate 200 may correspond to the size of a single battery module 100. Meanwhile, in the embodiment of FIG. 5, since a single electrical equipment plate 200 is located on four battery modules 100, the size of the electrical equipment plate 200 may correspond to the sum of four battery modules 100. However, this is just an example, and if a plurality of battery modules 100 are included, the electrical equipment plate 200 may not be sized to cover the entire battery modules 100. For example, in case four battery modules 100 are included, the electrical equipment plate 200 may also be configured to have a size corresponding to one or two battery modules 100.

Figure 6:
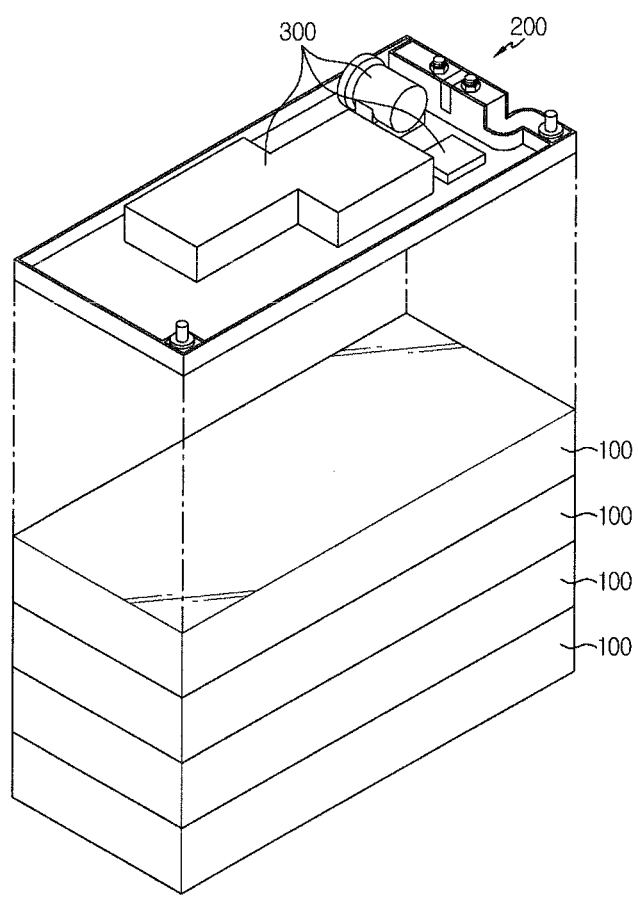
FIG. 6 is a schematic diagram showing a battery pack according to still another embodiment of the present disclosure.

FIG. 6 is a schematic diagram showing a battery pack according to still another embodiment of the present disclosure.

Referring to FIG. 6, the battery pack according to the present disclosure may include a plurality of battery modules 100, which are entirely or partially stacked in parallel in a vertical direction, or in a direction perpendicular to the ground.

In addition, the electrical equipment plate 200 may be located on an uppermost battery module 100 among the plurality of battery modules 100. For example, as shown in FIG. 6, if four battery modules 100 are stacked vertically, the electrical equipment plate 200 may be located on the uppermost battery module 100. In this configuration of the present disclosure, even though the battery pack includes a plurality of battery modules 100, the electrical equipment plate 200 may be easily accessed from above, which allows each inspection, installation and exchange of the electrical equipment plate 200 as well as partial exchange of the electrical equipment 300. Meanwhile, if the battery pack having a plurality of battery modules 100 includes a single electrical equipment plate 200 as described above, the electrical equipment plate 200 may be configured to manage charging/discharging operations of the plurality of battery modules 100 as a whole.

Figure 7:
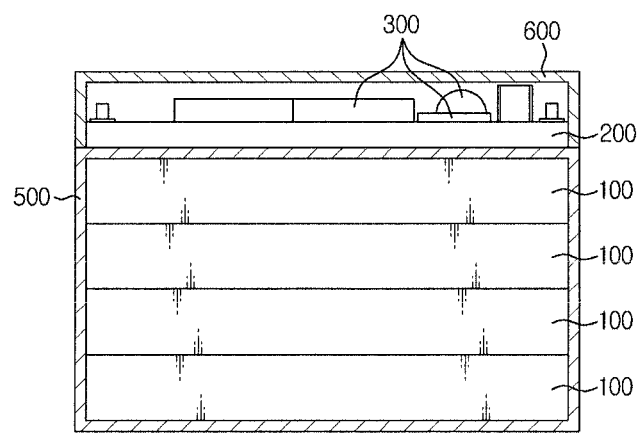
FIG. 7 is a schematic diagram showing a battery pack according to further another embodiment of the present disclosure.

FIG. 7 is a schematic diagram showing a battery pack according to further another embodiment of the present disclosure.

Referring to FIG. 7, the battery pack according to the present disclosure may include a module case 500. The module case 500 may have an empty space therein to accommodate at least one battery module 100 in the inner space. The module case 500 may not accommodate the electrical equipment plate 200 in the inner space, different from the pack case depicted in FIG. 4.

In this case, as shown in FIG. 7, the electrical equipment plate 200 may be located on the module case 500. For this, the module case 500 may have a mounting unit for mounting the electrical equipment plate 200 on its upper surface.

In this embodiment of the present disclosure, since the battery module 100 is managed in the unit of the module case 500, it may be easier to handle only the battery module 100, excluding the electrical equipment plate 200. In particular, if the battery pack includes a plurality of battery modules 100, the plurality of battery modules 100 may be included in a single module case 500, and the electrical equipment plate 200 is not located in the module case 500, which may ensure more convenient management of the plurality of battery modules 100. In addition, since the electrical equipment plate 200 is located out of the module case 500, the electrical equipment plate 200 may be easily accessed, and it will be easier to inspect, install or exchange the electrical equipment plate 200 as well as partially exchange the electrical equipment 300.

Meanwhile, in this embodiment of the present disclosure, as shown in FIG. 7, the battery pack according to the present disclosure may further include an electrical equipment cover 600.

If the electrical equipment plate 200 is located on the battery module 100, the electrical equipment cover 600 may cover the upper portion of the electrical equipment plate 200. If the electrical equipment plate 200 is exposed outwards, the electrical equipment 300 mounted to the electrical equipment plate 200 may be easily broken or damaged. However, in this configuration of the present disclosure, since the electrical equipment plate 200 is not exposed outwards, it is possible to prevent the electrical equipment 300 from being broken or damaged due to an impact or penetration of impurities.

The electrical equipment cover 600 may be configured to cover only the upper portion of the electrical equipment plate 200 as shown in FIG. 7, but the present disclosure is not limited thereto. For example, the electrical equipment cover 600 may have a sealed box shape to accommodate the electrical equipment plate 200 in its inner space so as to cover both the upper and lower portions of the electrical equipment plate 200.

In addition, the battery pack according to the present disclosure may further include a pack case which accommodates the module case 500 and/or the electrical equipment cover 600.

Meanwhile, even though it is depicted in various embodiments that a single electrical equipment plate 200 is included, the present disclosure is not limited thereto, and the battery pack according to the present disclosure may include two or more electrical equipment plates 200.

The battery pack according to the present disclosure may be applied to a vehicle such as an electric vehicle and a hybrid vehicle. In other words, the vehicle according to the present disclosure may include the battery pack according to the present disclosure as described above.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, the terms indicating up, down, left and right directions are used in the specification, but it is obvious to those skilled in the art that these merely represent a relative location and may vary based on a location of an observer or a shape in which an object is placed.

What is claimed is:

1. A battery pack, comprising:
   at least one battery module, the battery module including a plurality of secondary batteries; and
   an electrical equipment plate having a plate shape on which at least two of a battery management system (BMS), a current sensor having two terminals, a relay having two terminals and a fuse having two terminals are mounted, the electrical equipment plate being electrically connected to the at least one battery module,
   wherein at least one bus bar is mounted on the electrical equipment plate, and at least two of the current sensor, the relay and the fuse are electrically connected by the bus bar,
   wherein the at least one bus bar is located between the electrical equipment plate and the two terminals of at least one of the current sensor, the relay and the fuse,
   wherein a plate protrusion is provided on the electrical equipment plate, a coupling hole is formed in the at least one bus bar, and the plate protrusion is inserted into the coupling hole so that the bus bar is fixed onto the electrical equipment plate,
   wherein through holes are formed in both terminals of at least one of the current sensor, the relay and the fuse, and the plate protrusion is inserted into the through holes so that both terminals of at least one of the current sensor, the relay and the fuse are connected and fixed to the bus bar, and
   wherein the battery module includes a module protrusion formed at an upper portion thereof, and the electrical equipment plate has a plate hole formed at a location corresponding to the module protrusion, so that the module protrusion is inserted into and fixed in the plate hole.

2. The battery pack according to claim 1, wherein the electrical equipment plate is located at an upper portion of the battery module.

3. The battery pack according to claim 1, wherein the plate protrusion is fixed by a nut after being inserted into the coupling hole and the through holes.

4. The battery pack according to claim 1, wherein the plate protrusion is firstly inserted into the coupling hole of the bus bar and then inserted into the through hole of at least one of the current sensor, the relay and the fuse.

5. The battery pack according to claim 1, wherein the at least one bus bar includes two bus bars, and
   wherein the battery module includes a cathode module terminal and an anode module terminal which protrude upwards, coupling holes are formed in at least two of the bus bars, and the cathode module terminal and the anode module terminal are respectively inserted into the coupling holes of the two bus bars for electric connection and fixation.

6. The battery pack according to claim 1, wherein the electrical equipment plate has a bus bar insert so that the bus bar is at least partially inserted into the bus bar insert.

7. The battery pack according to claim 1, wherein the BMS has a connection hole formed at a location corresponding to the plate hole, so that the module protrusion is inserted into and fixed in both the plate hole and the connection hole.

8. The battery pack according to claim 1, wherein the battery module includes a connector connected to both ends of at least one of the plurality of secondary batteries, and the connector is inserted into a port of the BMS.

9. The battery pack according to claim 1, wherein the at least one battery module is a plurality of battery modules which are arranged in parallel in a horizontal direction, and
   wherein the electrical equipment plate is located on the plurality of battery modules arranged in parallel in a horizontal direction.

10. The battery pack according to claim 1,
    wherein the at least one battery module is a plurality of battery modules which are stacked in parallel in a vertical direction, and
    wherein the electrical equipment plate is located on an uppermost battery module among the plurality of battery modules.

11. The battery pack according to claim 1, further comprising:
    a module case for accommodating the battery module in an inner space thereof,
    wherein the electrical equipment plate is located on the module case.

12. A vehicle, comprising the battery pack defined in claim 1.

13. The battery pack according to claim 1, further comprising:
    a pack case for accommodating the battery module and the electrical equipment plate in an inner space thereof.

14. The battery pack according to claim 13, wherein the pack case includes a lower case having an inner space with an open upper portion and an upper case coupled to the upper open portion of the lower case.

15. The battery pack according to claim 13, wherein the pack case has an opening formed in an upper portion thereof at a location corresponding to at least one of the BMS, the current sensor, the relay and the fuse.

16. The battery pack according to claim 15, wherein the pack case has a cover provided at the opening to open or close the opening.

* * * * *